US008929741B2

(12) United States Patent
Fattal et al.

(10) Patent No.: US 8,929,741 B2
(45) Date of Patent: Jan. 6, 2015

(54) OPTICAL INTERCONNECT

(75) Inventors: David A. Fattal, Palo Alto, CA (US);
Robert N. Bicknell, Corvallis, OR (US);
Charles Santori, Palo Alto, CA (US);
Wei Wu, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1178 days.

(21) Appl. No.: 11/881,943

(22) Filed: Jul. 30, 2007

(65) Prior Publication Data
US 2009/0034985 A1 Feb. 5, 2009

(51) Int. Cl.
*H04B 10/80* (2013.01)

(52) U.S. Cl.
CPC .................................. *H04B 10/803* (2013.01)
USPC ........................................................ 398/130

(58) Field of Classification Search
USPC .................................................. 398/131, 135
See application file for complete search history.

(56) References Cited

U.S. PATENT DOCUMENTS

| 3,215,842 A * | 11/1965 | Thomas ........................ 398/170 |
| 4,780,791 A * | 10/1988 | Morita et al. ............. 361/679.31 |
| 4,850,044 A * | 7/1989 | Block et al. .................... 398/118 |
| 4,892,376 A * | 1/1990 | Whitehouse ................... 398/164 |
| 4,939,793 A * | 7/1990 | Stewart ........................ 398/170 |
| 5,101,460 A * | 3/1992 | Richard ........................... 385/37 |
| 5,233,184 A * | 8/1993 | Chirovsky et al. ......... 250/214 LS |
| 5,247,501 A * | 9/1993 | Hashimoto et al. ......... 369/44.11 |
| 5,361,157 A * | 11/1994 | Ishikawa et al. .............. 398/168 |
| 5,832,147 A * | 11/1998 | Yeh et al. ........................ 385/14 |
| 5,844,711 A * | 12/1998 | Long, Jr. ....................... 359/291 |
| 5,920,664 A * | 7/1999 | Hirabayashi et al. ........... 385/16 |
| 5,991,058 A * | 11/1999 | Feuer et al. ..................... 398/72 |
| 6,248,069 B1 * | 6/2001 | Liu et al. ....................... 600/437 |
| 6,493,123 B1 * | 12/2002 | Mansell et al. ............... 398/169 |
| 6,748,153 B2 * | 6/2004 | Van Doorn .................... 385/134 |
| 6,771,845 B2 * | 8/2004 | Levy et al. ....................... 385/14 |
| 6,947,200 B2 * | 9/2005 | Huibers ......................... 359/291 |
| 7,003,048 B1 * | 2/2006 | Eibel et al. .................... 375/295 |
| 7,257,093 B1 * | 8/2007 | Witzke et al. .............. 370/310.1 |

(Continued)

FOREIGN PATENT DOCUMENTS

| EP | 0811862 B1 | 8/2004 |
| JP | 02-041042 | 2/1990 |

(Continued)

OTHER PUBLICATIONS

International Search Report; PCT Patent Application No. PCT/US2008/009226, filed Jul. 30, 2008; search issued by Korean Patent Office (ISA).

*Primary Examiner* — David Payne
*Assistant Examiner* — Tanya Motsinger

(57) ABSTRACT

An optical interconnect includes a first circuit board having an optical source and an optical receiver; and a second circuit board having data source and an optical modulator optically coupled with the optical source and optical receiver, wherein the optical modulator is configured to encode data from the data source into an optical signal from the optical source. The optical receiver is configured to receive the optical signal from the optical modulator. A method of optical communication includes generating on a first circuit board an optical signal directed at a second circuit board; modulating the optical signal with data at the second circuit board; reflecting the optical signal to the first circuit board; and demodulating the optical signal to receive the data at the first circuit board.

14 Claims, 6 Drawing Sheets

(56) References Cited

U.S. PATENT DOCUMENTS

| | | | |
|---|---|---|---|
| 7,317,876 B1* | 1/2008 | Elliott | 398/170 |
| 7,831,150 B2* | 11/2010 | Roes et al. | 398/130 |
| 8,027,591 B2* | 9/2011 | Maryfield | 398/170 |
| 2001/0043381 A1* | 11/2001 | Green et al. | 359/172 |
| 2002/0060825 A1* | 5/2002 | Weigold et al. | 359/152 |
| 2003/0081281 A1* | 5/2003 | DeCusatis et al. | 359/124 |
| 2003/0124438 A1* | 7/2003 | Stepanov et al. | 430/2 |
| 2003/0202730 A1* | 10/2003 | Fujieda et al. | 385/14 |
| 2004/0091199 A1* | 5/2004 | Goodfellow | 385/16 |
| 2004/0208637 A1* | 10/2004 | Helbing et al. | 398/183 |
| 2004/0234232 A1* | 11/2004 | Levy et al. | 385/147 |
| 2005/0041277 A1* | 2/2005 | Huibers | 359/286 |
| 2005/0179977 A1* | 8/2005 | Chui et al. | 359/237 |
| 2005/0195370 A1* | 9/2005 | Gore et al. | 353/31 |
| 2005/0220386 A1* | 10/2005 | Nakada et al. | 385/1 |
| 2006/0001942 A1* | 1/2006 | Chui et al. | 359/245 |
| 2006/0067641 A1* | 3/2006 | Palmateer et al. | 385/147 |
| 2006/0077146 A1* | 4/2006 | Palmateer | 345/85 |
| 2006/0077153 A1* | 4/2006 | Cummings et al. | 345/85 |
| 2006/0104638 A1* | 5/2006 | Chung et al. | 398/71 |
| 2006/0269182 A1* | 11/2006 | Nakada et al. | 385/1 |
| 2007/0127928 A1* | 6/2007 | Varshneya et al. | 398/135 |
| 2007/0236774 A1* | 10/2007 | Gousev et al. | 359/291 |
| 2008/0192780 A1* | 8/2008 | Luo et al. | 372/14 |
| 2008/0304832 A1* | 12/2008 | Williams | 398/131 |
| 2008/0317474 A1* | 12/2008 | Wang et al. | 398/129 |
| 2009/0034049 A1* | 2/2009 | Dadkhah et al. | 359/276 |
| 2009/0142053 A1* | 6/2009 | Varshneya et al. | 398/33 |
| 2010/0067916 A1* | 3/2010 | Suzuki et al. | 398/130 |

FOREIGN PATENT DOCUMENTS

| | | |
|---|---|---|
| JP | 03-105589 | 5/1991 |
| JP | 4-131820 | 5/1992 |
| JP | 04175704 | 6/1992 |
| JP | 05129650 | 5/1993 |
| JP | 06-132903 A | 5/1994 |
| JP | 08-096677 | 4/1996 |
| JP | 09-044272 | 2/1997 |
| KR | 10-0569616 A | 4/2006 |

\* cited by examiner

OPTICAL INTERCONNECT

BACKGROUND

Light beams or optical signals are used for a variety of purposes in electronic systems. For example, an optical signal may be used to transmit data, for position or motion sensing, for taking measurements or for any of a variety of other tasks.

Consequently, optical technology plays a significant role in modern electronics, and many electronic devices employ optical components. Examples of such optical components may include optical or light sources such as light emitting diodes and lasers, waveguides, fiber optics, lenses and other optics, photo-detectors and other optical sensors, optically-sensitive semiconductors, and others.

Systems making use of optical components often rely upon the precise manipulation of optical energy, such as a beam of light, to accomplish a desired task. As indicated, optical signals are frequently used to transmit digital data between electronic devices, both over long distances and between adjacent circuit boards or even between components on a single circuit board. In such an optical signal, a light beam may be modulated with a data signal so that the light beam then carries and transmits the data. This process is known as encoding. The encoded optical signal is then directed to a sensor where it is received and the data decoded.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
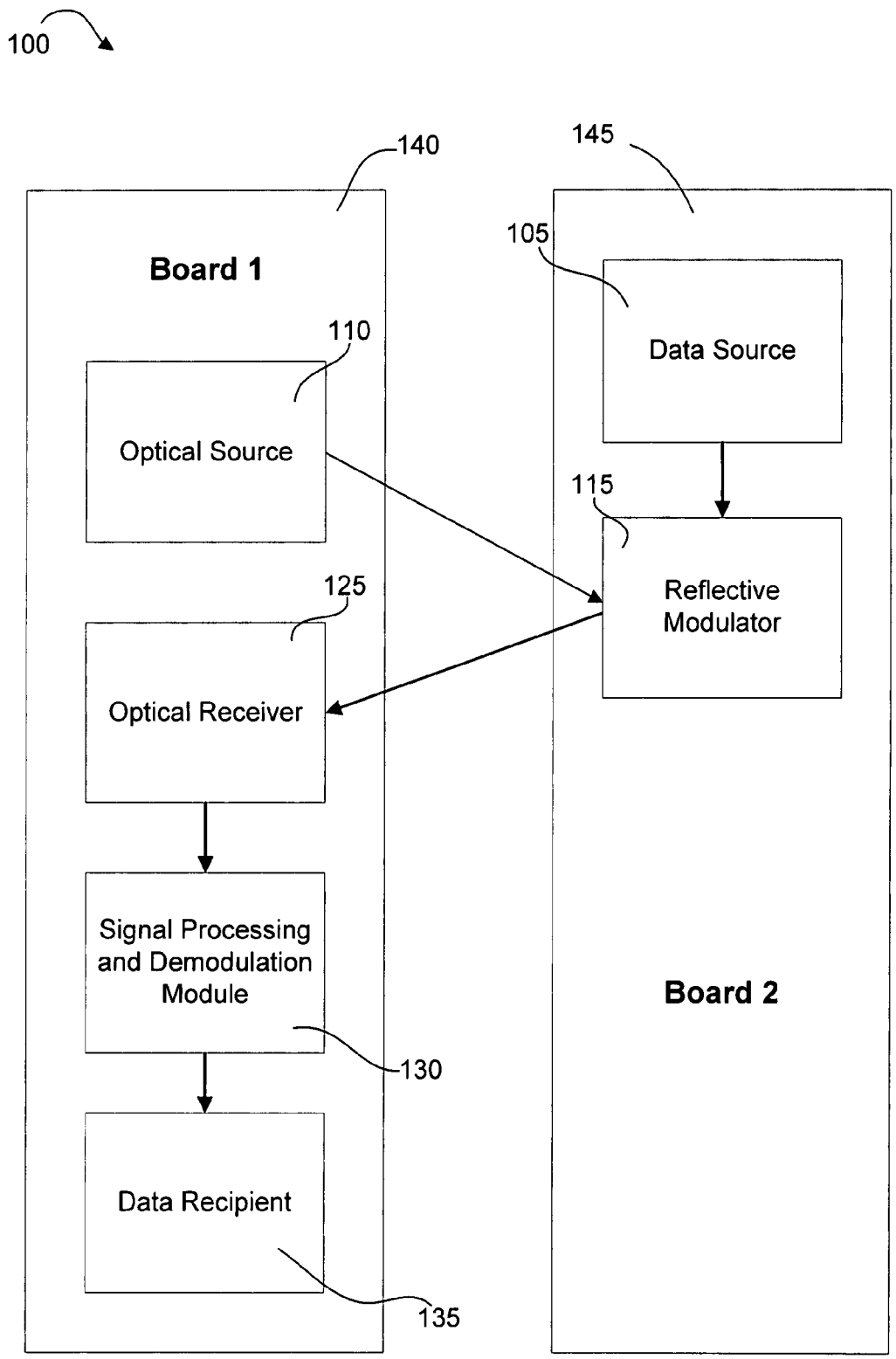
FIG. 1 is a block diagram of an exemplary optical interconnect, according to principles described herein.

As noted above, light beams or optical signals can be used for a variety of purposes, including the transmission of data. In some such systems, the optical signal is directed or redirected into an optical path where it can be detected or received by a designated component. Additionally, in some embodiments, it may be desirable to utilize a single channel to carry data among multiple circuit boards in order to optimize efficiency and minimize the space used on each circuit board.

When transmitting data optically, the optical signal can be transmitted between sending and receiving components through one or more waveguides or can be transmitted directly through free space between the sending and receiving components. Both options present different issues.

With free space transmission, the sending and receiving components need to be properly aligned. When waveguides are used, alignment is easier to achieve and the optical path can take on any shape. However, there are extra fabrication costs, optical losses at waveguide junctions and additional space on the circuit board taken up by the waveguide.

In many examples, waveguides are used despite these issues to minimize alignment concerns. For example, plastic waveguides can be used to route an optical signal bearing data to the edge of a circuit board. The optical signal can then be directed into optical waveguides in a backplane of a circuit board rack, and then into another waveguide on another circuit board. However, such waveguide solutions, in general, have a longer physical data path than free space optical data transmission between components.

Consequently, it would be desirable to provide a free space optical interconnect system for inter-component data transmission between a plurality of circuit boards that is resistant to misalignment while occupying minimal amounts of circuit board space.

To accomplish these and other goals, the present specification discloses exemplary systems and methods relating to an optical interconnect having an optical source, an optical modulator, and an optical receiver configured to receive the reflected modulated optical signals from the modulator. More specifically, when communication need only be one way, an exemplary free space optical interconnect system includes one circuit board supporting both an optical source and receiver, while another circuit board includes an optical modulator.

As used in the present specification and in the appended claims, the term "light beam" or "optical energy" refers to radiated energy having a wavelength generally between 10 nanometers and 500 microns. Optical energy as thus defined includes, but is not limited to, ultraviolet, visible, and infrared light. A beam of optical energy may be referred to herein as a "light beam" or "optical signal."

As used in the present specification and in the appended claims, the term "optical source" refers to a device from which optical energy originates. Examples of optical sources as thus defined include, but are not limited to, light emitting diodes, lasers, light bulbs, and lamps.

As used in the present specification and in the appended claims, the term "optical interconnect" refers broadly to a component that links portions of an optical pathway along which a light beam is propagating. The optical interconnect may guide or redirect the light beam so that the beam is incident on or reaches an optical component configured to receive the light beam. Consequently, with appropriate optical interconnects, an optical pathway can be configured with any length or shape as suits a particular application.

As used in the present specification and in the appended claims, the term "collimate" refers to a process by which a plurality of divergent optical rays are redirected into a substantially parallel orientation with respect to each other. A divergent beam from a single source can be collimated with respect to itself. Alternatively or additionally, light beams from separate sources can also be collimated with respect to each other.

As used in the present specification and in the appended claims, the term "refocus" refers to a process by which a plurality of optical signals propagating in a substantially parallel direction are manipulated to substantially converge to a point.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary optical interconnects and exemplary systems and methods of utilizing the exemplary optical interconnects.

Exemplary Optical Interconnects

Referring now to FIG. 1, a block diagram of an exemplary optical interconnect (100) is shown. The exemplary optical interconnect (100) includes a first circuit board (140) that supports an optical source (110), an optical receiver (125), a signal processing module (130) and at least one data recipient (135). The data recipient (135) may be, for example, a process, controller or other device that can receive and use electronic data.

A second circuit board (145) is also provided adjacent the first circuit board (140). The second circuit board (145) supports, for example, a data source (105) and a reflective modulator (115).

In the illustrated example, data from the data source (105) on the second circuit board (145) is needed by the data recipient (135) on the first circuit board (140). Therefore, as will be described in further detail below, data from the data source (105) is transmitted optically from the second circuit board (145) to the first circuit board (140). The signal processing module (130) on the first board (140) decodes and outputs the data received from the data source (105) on the second board (145) to the data recipient (135).

In the illustrated example, the optical source (110) on the first circuit board (140) generates a light beam which is directed to the reflective modulator (115) on the second circuit board (145). Thus, the optical source (110) and reflective modulator (115) are optically coupled. This coupling may be a free space optical path as illustrated in FIG. 1 or may include waveguides or other optical elements to bend and shape the coupling as best suits a particular application.

The optical modulator (115) may be configured to selectively switch on and off or otherwise manipulate the light beams produced by the optical source (110) in response to a data signal from the data source (105), thereby encoding data from the data source (105) into the optical signal for data transmission. As will be well understood by those skilled in the art, a variety of possible optical modulation schemes exist and may be used to encode data from the data source (105) into an optical signal produced by the optical source (110).

The optical modulator (115) in the present example may also be configured to be a reflective modulator which reflects a light beam, after modulation, back through the optical coupling between the first and second circuit boards (140, 145, respectively). The modulated light beam or optical signal is thus provided by the optical coupling to the optical receiver (125) on the first circuit board (140).

The optical receiver (125) detects the modulated light beam and outputs a corresponding signal to the signal processing and demodulation module (130). The signal processing and demodulation module (130) demodulates the data carried by the modulated light beam and provides that data, in a useable form, to the data recipient (135).

Various details of the components in this exemplary system will now be discussed. For example, the reflective modulator (115) may utilize a microelectromechanical system (MEMS) resonator to modulate and reflect the light beam. Also, the optical modulator (115) may be configured to be selectively transmissive such that an optical signal outside of a certain wavelength or band of wavelengths will be transmitted through the modulator (115). In such an example, the modulator (115) is configured to be highly reflective to optical signals of a specific wavelength or band of wavelengths, but substantially transparent to optical signals of other wavelengths. The optical signal from the optical source (110) is correspondingly configured to be of a wavelength that can be modulated and reflected by the modulator (115).

Additionally, the modulator (115) may be configured to be tunable such that the band of wavelengths the modulator (115) is configured to reflect and modulate may be controlled. Modulators (115) of this sort may utilize MEMS, index modulation via charge injection, index modulation via optical non-linearity or external optical signal control electro-optic effect to modulate the beam, for example. The optical modulator (115) may, in some embodiments, be comprised of a guided mode resonance structure (GMR). In other embodiments, the optical modulator may be comprised of a quantum well modulator, a thin-film filter, or the like.

The optical source (110) may, in some embodiments, be comprised of a vertical cavity surface emitting laser ("VCSEL"). In other embodiments, the optical source (110) may include other types of semiconductor lasers, light-emitting diodes, lamps, incandescent lights, or the like.

In some embodiments, the data source (105) may be one or more integrated circuits on the second circuit board (145) that provide digital or analog data for transmission to the data recipient (135). As shown, the data source (105) is in communication with the reflective modulator (115). When the optical source (110) provides a light beam of the proper wavelength, the modulator (115) may modulate the light beam and reflect the modulated light beam or optical signal to the optical receiver (125) on the first circuit board (140). In some embodiments, the data source (105) may include multiple separate components that all provide data or contribute to the data produced for transmission by the modulator (115) to the first circuit board (140).

The optical receiver (125) receives the modulated light beam and outputs an electric signal representative of one or more aspects of the modulated light beam, such as amplitude, phase, etc. For example, the optical receiver (125) may produce data signals bearing the data that has been encoded or modulated in the received light beam. In this way, data transmitted from components of the data source (105) may be received and utilized by the data recipient (135).

In some embodiments, the optical receiver (125) may include one or more photo-detectors or light sensors, such as, for example, a photodiode. In other embodiments, the optical receiver (125) may include, but is not limited to, one or more waveguides, fiber optic material, optical cable, optical sensors, lenses, optically sensitive semiconductors, and combinations thereof.

Before being passed to the data recipient (135), signals received by the optical receiver (125) may be analyzed by the signal processing and demodulation module (130). The module (130) may match the data from a modulated light beam with an intended data recipient (135), if there are multiple possible recipients on the circuit board. The intended data recipient or recipients (135) may be discerned by any of a variety of different methods known in the art, as will be explained in more detail in relation to other figures of the present specification.

Figure 2:
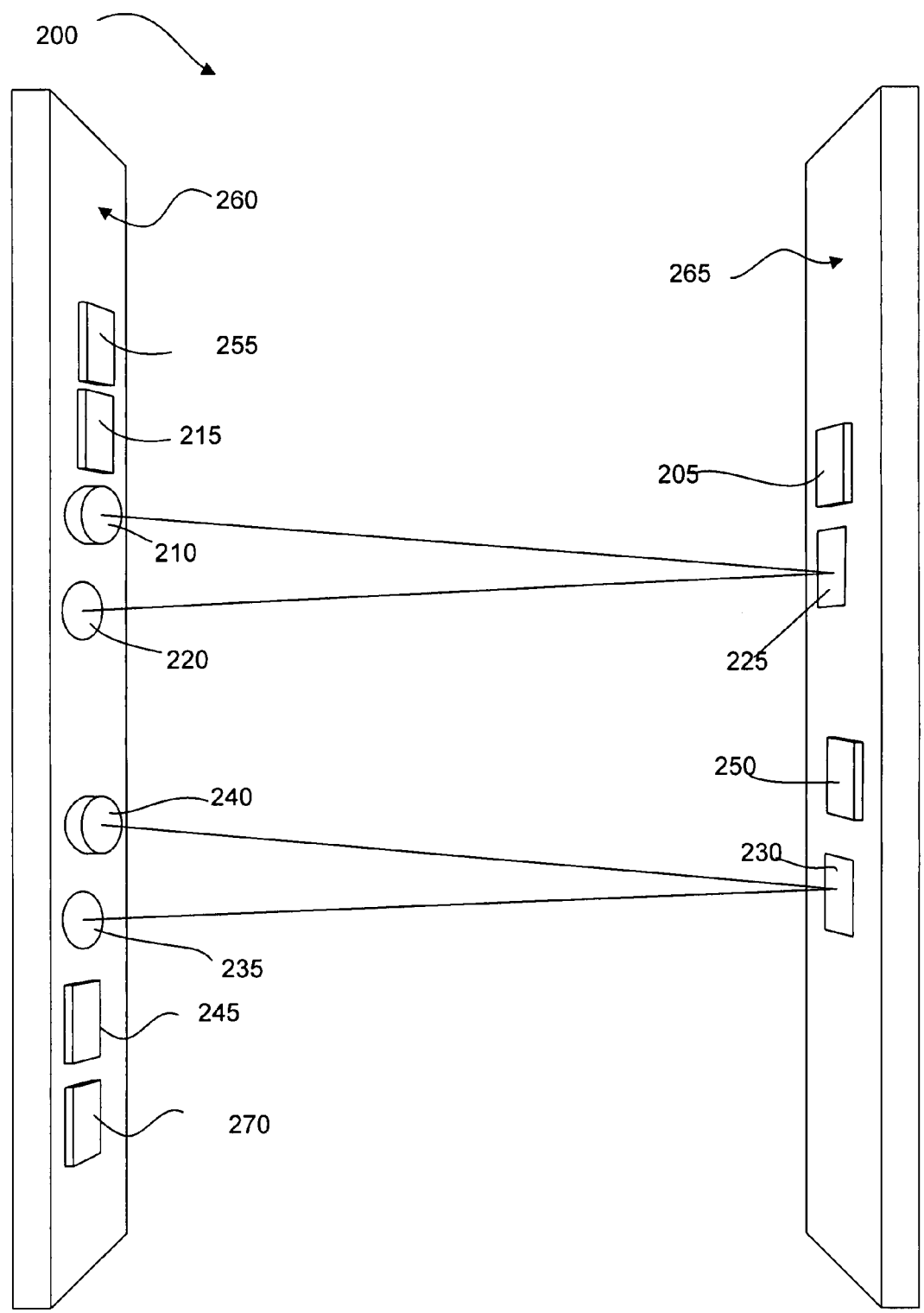
FIG. 2 is a block diagram of an exemplary optical interconnect, according to principles described herein.

Referring now to FIG. 2, an illustration of another exemplary optical interconnect (200) is shown. While the exemplary optical interconnect (200) employs similar components to those described in FIG. 1, the exemplary optical interconnect (200) of the present embodiment is configured for parallel transmission and reception of data in two different channels.

The exemplary optical interconnect (200) includes first and second optical sources (210, 240, respectively), first and second optical receivers (220, 235, respectively), and first and second signal processing modules (215, 245, respectively) located on a first circuit board (260). On a second, circuit board (265), first and second data sources (205, 250, respectively), and first and second optical modulators (225, 230) are configured to provide data, as described above, from the data sources (205, 250) to the first and second data recipients (255, 270, respectively) on the first circuit board (260).

In the illustrated example, the first optical modulator (225) is configured to modulate and reflect optical signals from the first optical source (210) using data from the first data source (205). The second optical modulator (230) is configured to modulate and reflect optical signals from the second optical source (240), thereby transmitting data from the second data source (250). Optical signals modulated by the first modulator (225) are reflected towards the first optical receiver (220), and optical signals modulated by the second optical modulator (230) are likewise reflected towards the second optical receiver (235).

Although the present example only provides two complete optical data channels, it is understood that any number of such data channels could be provided as best suits a particular application.

Exemplary Systems

Figure 3:
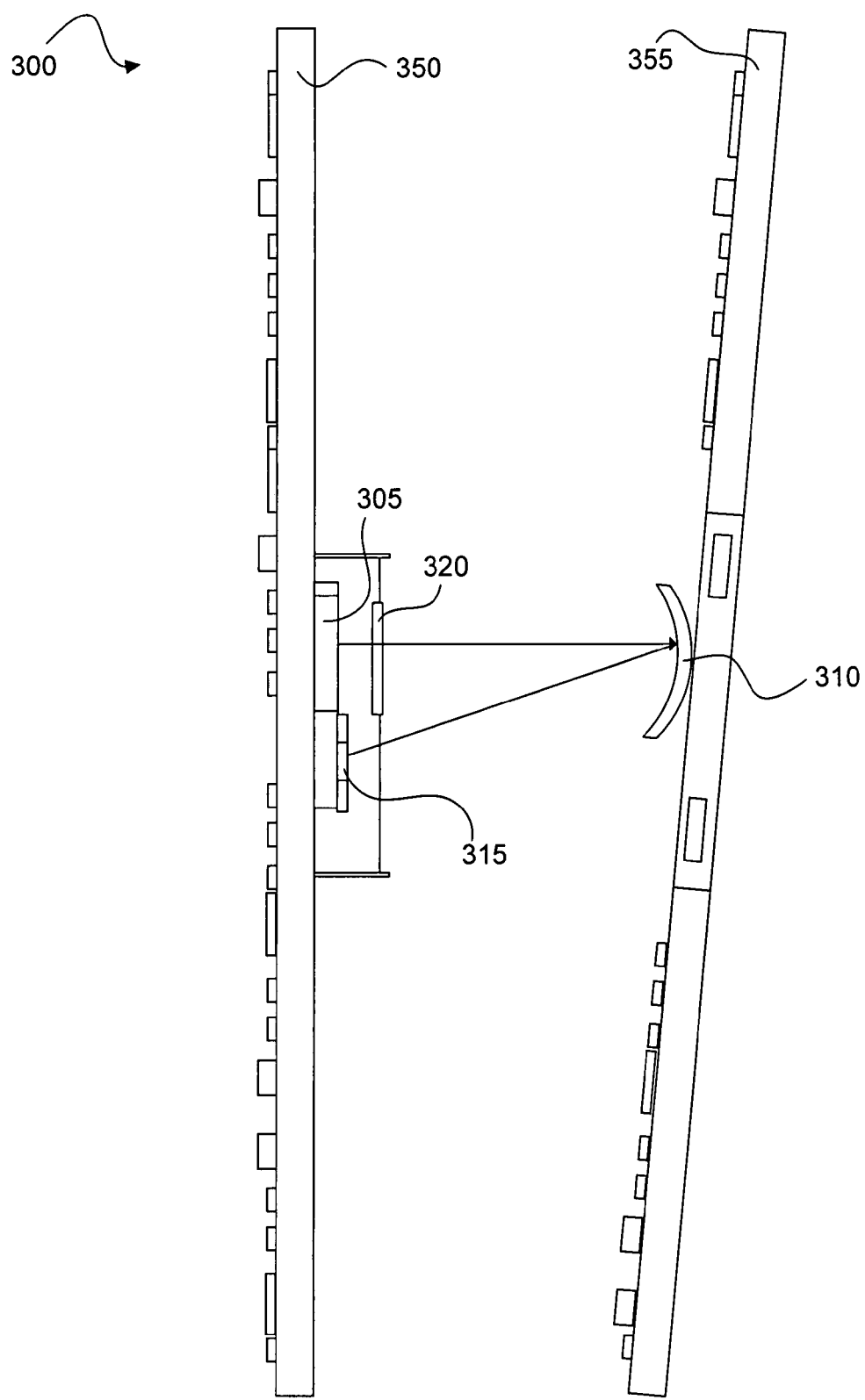
FIG. 3 is an illustration of an exemplary optical interconnect, according to principles described herein.

Referring now to FIG. 3, an exemplary system (300) is shown. The exemplary optical interconnect (300) includes an optical source (305) and an optical receiver (315) located on a first circuit board (350). A reflective optical modulator (310) is positioned on a second circuit board (355).

As shown in FIG. 3, the circuit boards in a system may exhibit a certain degree of tilt with respect to each other or other forms of misalignment. Such misalignment may occur due to misplacement of the circuit boards (350, 355), vibrations, jolts, other shocks to the system, or various other reasons. For example, vibrations from a cooling fan may cause some misalignment between the circuit boards (350, 355). This misalignment of the boards (350, 355) may cause the optical signal generated by the optical source (305) to not be directed towards the exact center of the reflective modulator (310). Several methods may be employed, however, to ensure that the optical signal reaches its intended destination.

In the present embodiment, the optical modulator is shown as a two dimensional curved surface. This curvature may help the modulator be less sensitive to relative tilt between the two circuit boards (350, 355). In other embodiments, the modulator (310) may be shaped in other ways to correctly reflect the optical signals. Examples of possible shapes may include, but are not limited to, those that are curved in three dimensions, those that are substantially parabolic, two dimensional corner cube reflectors, three dimensional corner cube reflectors, and the like.

Also included in the present embodiment is a lens (320). In this embodiment, the lens is positioned between the optical source (305) and the reflective modulator (310). This lens (320) may help to collimate, redirect, or focus the optical signal so that it reaches its intended destination. One or more other lenses or mirrors may also be included at various points in the system to assist in routing, focusing or collimating the beam. These lenses or mirrors may be substantially fixed in position or may be translatable. In one possible embodiment, the lenses may be selectively altered by actuators. Sensors may also be employed to detect when optical components are misaligned, causing the actuators to shift the lenses and alter the direction of the beam.

Figure 4:
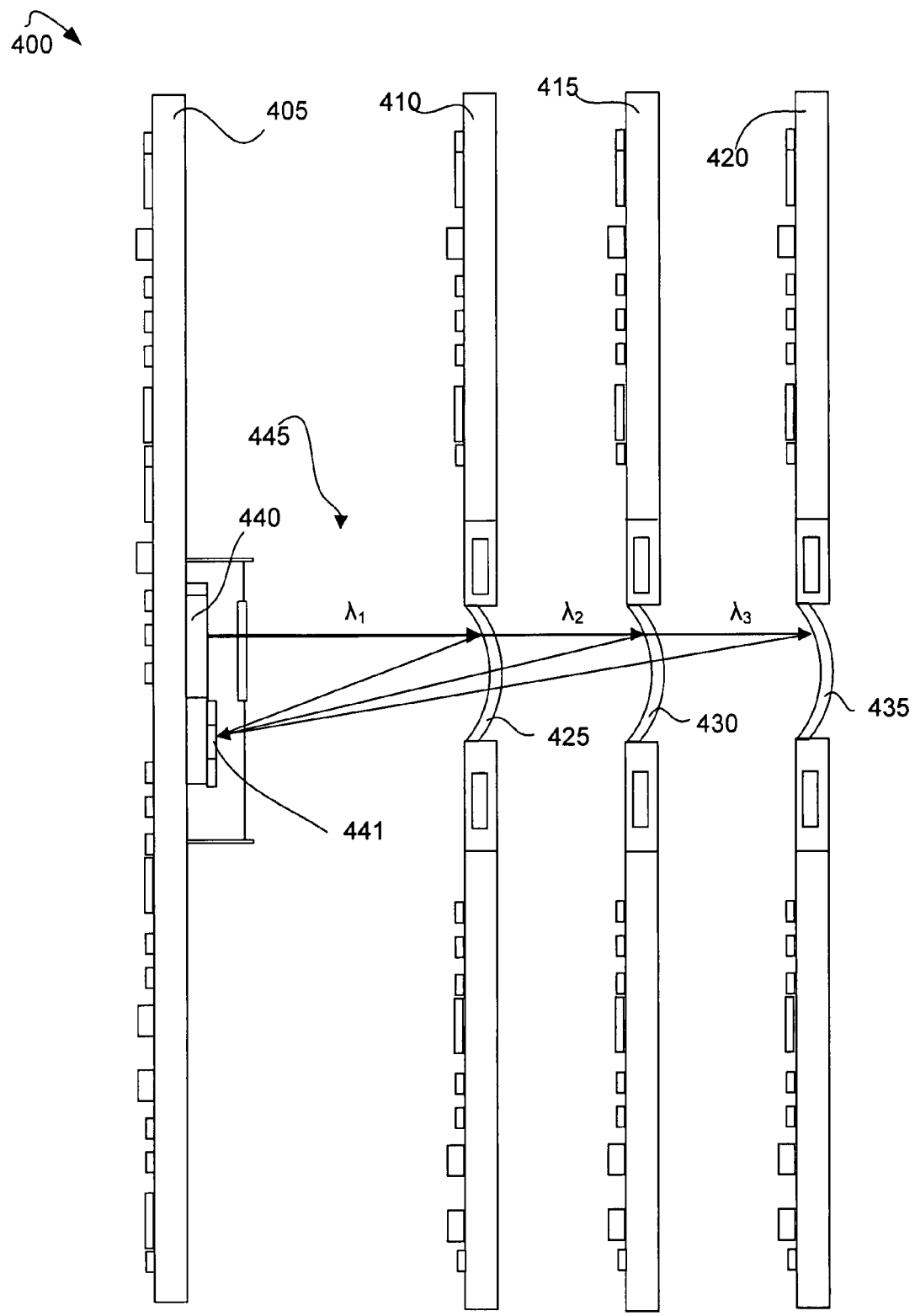
FIG. 4 is an illustration of an exemplary optical interconnect, according to principles described herein.

Referring now to FIG. 4, another exemplary system (400) is shown. The exemplary system (400) includes a first circuit board (405), a second circuit board (410), a third circuit board (415), and a fourth circuit board (420) and utilizes an exemplary optical interconnect (445) according to the principles of the present specification. The exemplary optical interconnect (445) is used to transmit data encoded on optical signals from the second (410), third (415) and fourth (420) boards to the first circuit board (405). The circuit boards (405, 410, 415, 420) may be housed in a rack, in which multiple circuit boards may be selectively connected, removed and/or replaced.

Because it is possible for the reflective modulators (425, 530, 435) to also act as gratings, or to combine grating structures and reflective modulators, one optical source (440) and receiver (441) located on the first board (605) may be used to allow many-to-one circuit board communication. In the present embodiment, the optical source (440) may be configured such that it may change the wavelength of the optical signal at any time. The optical modulators (425, 430, 435) of the present embodiment may be gratings such that they are substantially transparent to light of most wavelengths, but highly reflective to light in a narrow tunable band. The modulators (425, 430, 435) may be comprised of guided mode resonance filters (GMRs), for example. These modulators (425, 430, 435) may, in some embodiments, be mounted on a substantially transparent substrate, or alternatively be mounted in a void or hole in the circuit board, in order to allow non-reflected light to pass through the modulator and perhaps continue on towards another circuit board and modulator in the system.

In the present example, the modulator (430) on the second board (410) is configured to reflectively modulate only an optical signal with a wavelength of $\lambda_1$. The third and fourth boards (615, 620) are configured to selectively reflect and modulate light only of wavelengths $\lambda_2$ and $\lambda_3$, respectively.

For example, when the optical source emits an optical signal of wavelength $\lambda_2$, the beam would pass through the modulator (425) on the second circuit board (410) and be reflectively modulated by the modulator (430) on the third circuit board (415). The reflected beam may then be directed back to the optical receiver (441) on the first board (405) by the modulator (430) on the third board (415).

Thus, communication is established from the third circuit board (430) to the first circuit board (405). By controlling the wavelength emitted by the source (440), communication from any of the second, third or fourth circuit boards (425, 430, 435, respectively) to the first circuit board (405) may be established.

As it may be very desirable to replace boards in a rack quickly and easily, the optical interconnect (445) is configured to be tolerant of small placement errors of the circuit boards (405, 410, 415, 420). Consistent with principles discussed previously in the present specification, the system may also comprise curved or shaped modulators (425, 430, 435) and/or lenses and/or mirrors (not shown) configured to assist in the transmission of the optical signal to the correct destination. These lenses or mirrors may be substantially fixed in a position relative to a circuit board (405, 410, 415, 420) or may be translatable.

The optical receiver (441) in the optical interface (445) may have hardware and/or software to encode, modulate, decode, and/or demodulate data to and from optical signals that are transmitted and received between the circuit boards (405, 410, 415, 420). Furthermore, the optical interconnect (445) may include signal processing hardware and/or software to provide the information received from the optical signals to the intended data recipient. Additionally, board misalignment tolerances may be increased according to principles previously described in the present specification.

Exemplary Methods

Figure 5:
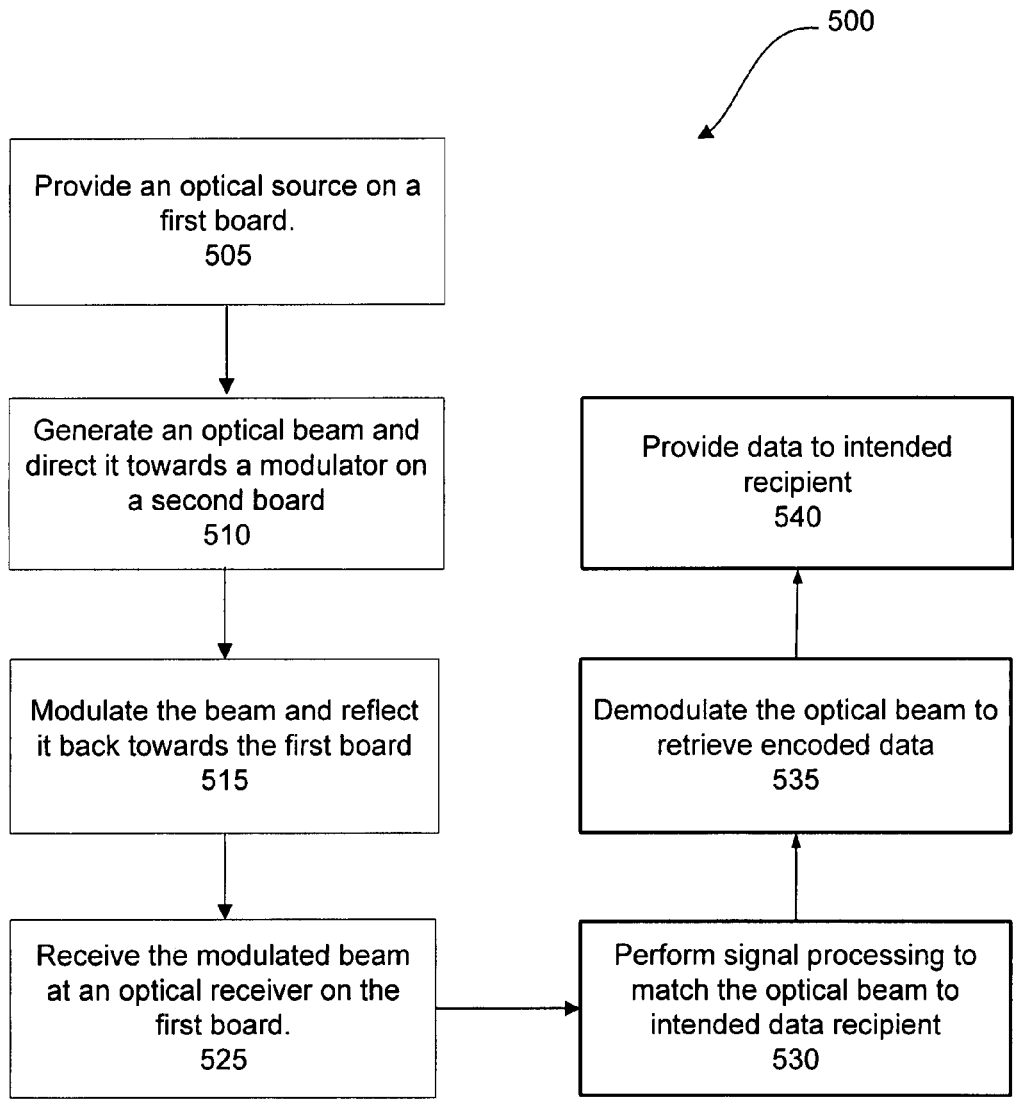
FIG. 5 is a flowchart illustrating an exemplary method of optical communication, according to principles described herein.

Referring now to FIG. 5, a flowchart illustrating an exemplary method (500) of optical communication is shown. The exemplary method (500) includes providing (step 505) an optical source on a first circuit board, generating (step 510) an optical signal and directing it towards a modulator on a second circuit board, modulating (step 515) the optical signal with a modulator on the second circuit board and reflecting the modulated optical signal back towards the first board, and receiving (step 525) the optical signal at an optical receiver on the first board.

Signal processing is then performed (step 530) to match the received optical signal to an intended data recipient. The received optical signal is then demodulated (step 535) to retrieve the encoded data, and the data is provided (step 540) to the intended recipient.

Figure 6:
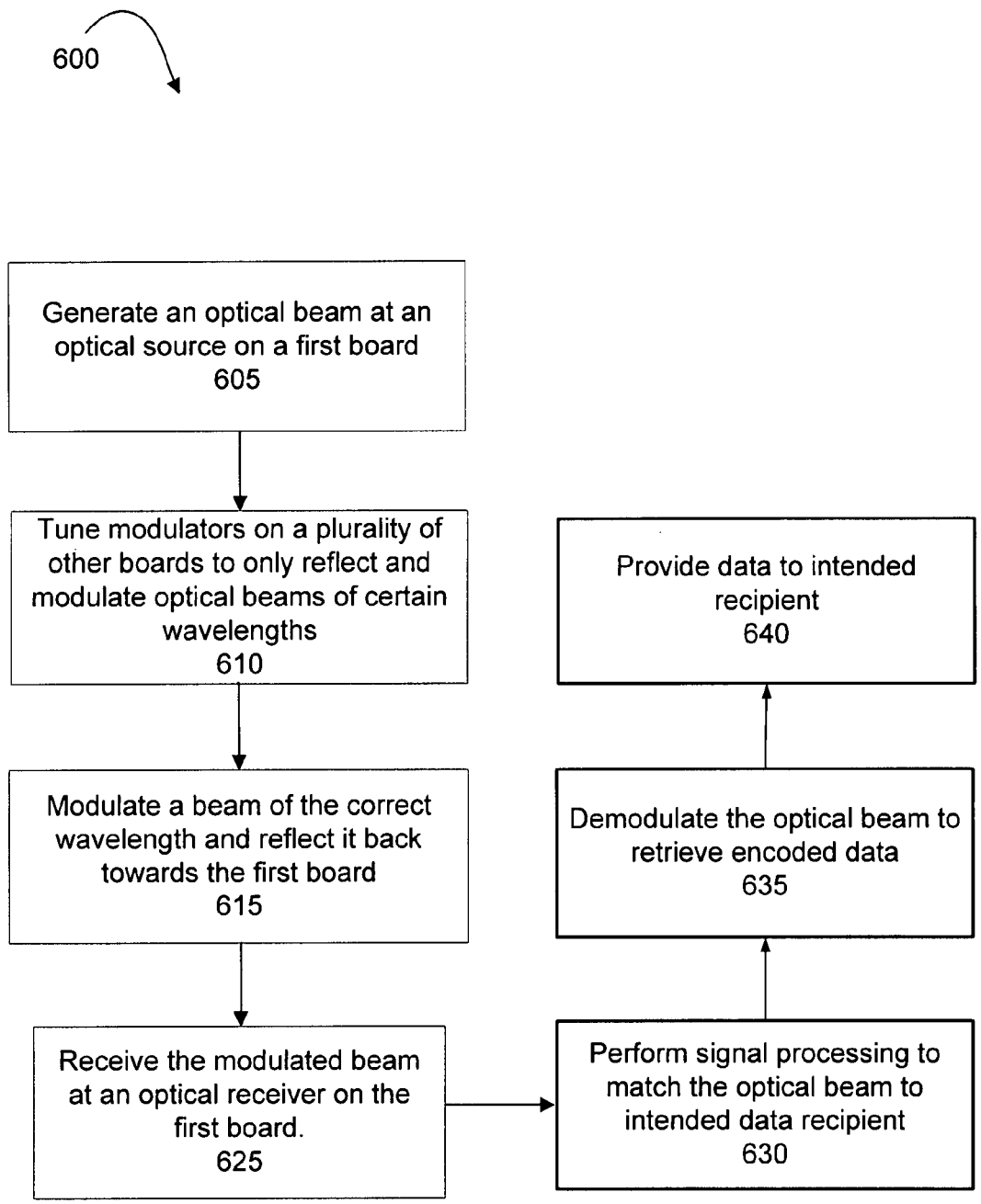
FIG. 6 is a flowchart illustrating an exemplary method of optical communication, according to principles described herein.

Referring now to FIG. 6, a flowchart illustrating an exemplary method (600) of optical communication is shown. The exemplary method (600) includes generating (step 605) an optical signal at an optical source on a first circuit board, tuning (step 610) modulators on a plurality of other boards to only reflect and modulate optical signals of certain wavelengths, modulating (step 615) an optical signal of the correct wavelength with a modulator on one of the other circuit boards and reflecting the modulated optical signal back towards the first board, and receiving (step 625) the optical signal at an optical receiver on the first board.

Signal processing is then performed (step 630) to match the received optical signal to an intended data recipient. The received optical signal is then demodulated (step 635) to retrieve the encoded data, and the data is provided (step 640) to the intended recipient.

What is claimed is:

1. An optical interconnect, comprising:
a first circuit board having an optical source and an optical receiver; and
a second circuit board having a data source and an optical modulator optically coupled with said optical source and optical receiver, wherein said optical modulator is configured to encode data from said data source into an optical signal from said optical source;
wherein said optical receiver is configured to receive said optical signal from said optical modulator;
wherein said modulator is selectively reflective to a particular wavelength or band of wavelengths and transmits other wavelengths; and
wherein said second circuit board is transparent such that said other wavelengths are transmitted through said second circuit board.

2. The optical interconnect of claim 1, wherein said optical receiver is configured to decode said data from said optical signal and provide said data to a data recipient component on said first circuit board.

3. The optical interconnect of claim 1, further comprising a plurality of optical data channels, each optical data channel comprising a corresponding optical source and optical receiver on said first circuit board and a corresponding modulator on said second circuit board.

4. The optical interconnect of claim 1, wherein said modulator is tunable as to the wavelength or band of wavelengths reflected.

5. An optical interconnect, comprising:
a first circuit board having an optical source and an optical receiver; and
a second circuit board having data source and an optical modulator optically coupled with said optical source and optical receiver, wherein said optical modulator is configured to encode data from said data source into an optical signal from said optical source;
wherein said optical receiver is configured to receive said optical signal from said optical modulator;
wherein said modulator is selectively reflective to a particular wavelength or band of wavelengths and transmits other wavelengths;
wherein said modulator is disposed in an opening through said second circuit board such that said other wavelengths are transmitted through said opening.

6. An optical interconnect, comprising:
a first circuit board having an optical source and an optical receiver; and
a second circuit board having a data source and an optical modulator optically coupled with said optical source and optical receiver, wherein said optical modulator is configured to encode data from said data source into an optical signal from said optical source;
wherein said optical receiver is configured to receive said optical signal from said optical modulator;
wherein said modulator is selectively reflective to a particular wavelength or band of wavelengths and transmits other wavelengths; and
wherein said interconnect comprises at least a third circuit board comprising a modulator and data source, wherein said modulator on said third circuit board is optically coupled to said optical source and optical receiver on said first circuit board through said modulator on said second circuit board.

7. The optical interconnect of claim 6, wherein said modulator on said third circuit board is selectively reflective to only a particular wavelength or band of wavelengths different from said particular wavelength or band of wavelengths reflected by said modulator on said second circuit board.

8. The optical interconnect of claim 7, wherein said modulators comprise guided mode resonance filters.

9. A method of optical communication, said method comprising:
generating on a first circuit board an optical signal directed at a second circuit board;
modulating said optical signal with data at said second circuit board;
reflecting said optical signal to said first circuit board; and
demodulating said optical signal to receive said data at said first circuit board; and
transmitting said optical signal through one or more modulators on one or more other circuit boards that are not reflective of a wavelength of said optical signal before said optical signal reaches said modulator on said second circuit board.

10. The method of claim 9, further comprising, when modulating said optical signal, addressing said data to a particular data recipient component on said first circuit board.

11. The method of claim 9, further comprising receiving said optical signal from said first circuit board with a curved modulator on said second circuit board.

12. The method of claim 9, further comprising generating said optical signal within a particular range of wavelengths corresponding to a range of wavelengths reflected by a modulator on said second circuit board.

13. The method of claim 12, further comprising selectively controlling said range of wavelengths reflected by said modulator on said second circuit boards.

14. The method of claim 9, further comprising controlling a wavelength of said optical source to communicate with a modulator on a specific circuit board reflective of that wavelength.

* * * * *